(12) United States Patent
Friedman et al.

(10) Patent No.: US 9,597,947 B2
(45) Date of Patent: Mar. 21, 2017

(54) VEHICLE BODY STRUCTURE

(71) Applicant: Ford Global Technologies, LLC, Dearborn, MI (US)

(72) Inventors: Peter A. Friedman, Ann Arbor, MI (US); Aindrea McKelvey Campbell, Beverly Hills, MI (US); Garret Sankey Huff, Ann Arbor, MI (US); Amanda Kay Freis, Ann Arbor, MI (US); Ronald David Ketelhut, Novi, MI (US); S. George Luckey, Jr., Dearborn, MI (US); Laurent Bernard Chappuis, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 3 days.

(21) Appl. No.: 14/665,343

(22) Filed: Mar. 23, 2015

(65) Prior Publication Data
US 2016/0280048 A1 Sep. 29, 2016

(51) Int. Cl.
*B60J 5/04* (2006.01)

(52) U.S. Cl.
CPC ........... *B60J 5/0463* (2013.01); *B60J 5/0425* (2013.01); *B60J 5/0468* (2013.01); *B60J 5/0423* (2013.01)

(58) Field of Classification Search
CPC .............................. B60J 5/0423; B60J 5/0463
USPC ....................................................... 296/146.6
See application file for complete search history.

(56) References Cited

U.S. PATENT DOCUMENTS

| | | | |
|---|---|---|---|
| 4,860,496 A | 8/1989 | Hellriegel | |
| 5,490,310 A * | 2/1996 | Schleicher | ........... B21D 39/031 29/21.1 |
| 6,079,766 A | 6/2000 | Butler et al. | |
| 6,779,830 B2 | 8/2004 | Patberg et al. | |
| 7,530,624 B2 * | 5/2009 | Endo | ...................... B60J 5/0426 296/146.6 |
| 2011/0229250 A1 * | 9/2011 | Kleber | ................... B60J 5/0437 403/29 |

FOREIGN PATENT DOCUMENTS

| | | |
|---|---|---|
| JP | 2008044503 A | 2/2008 |
| JP | 2008056114 A | 3/2008 |
| JP | 2010241163 A | 10/2010 |

* cited by examiner

*Primary Examiner* — Joseph D Pape
*Assistant Examiner* — Dana Ivey
(74) *Attorney, Agent, or Firm* — Jason C. Rogers; Brooks Kushman P.C.

(57) ABSTRACT

A method of assembling vehicle-body components includes positioning a first component on a second component. The first component has a different coefficient of thermal expansion than the second component and one of the first and second components defines a slot. The method also includes loosely installing a bolt though the slot and the first and second components, and creating a joint in the first and second components. The method further includes heating the first and second components, which causes the first and second components to move relative to each other due to thermal expansion in response to the heating. This movement causes the joint to fail. The method also includes tightening the bolt.

19 Claims, 4 Drawing Sheets

VEHICLE BODY STRUCTURE

TECHNICAL FIELD

The present disclosure relates to a vehicle-body structure constructed from multiple materials.

BACKGROUND

Current government regulations and fuel costs have increased the importance of producing motor vehicles that are fuel efficient. This increased emphasis on fuel efficiency has increased demand for lightweight-vehicle components, such as aluminum-alloy vehicle components. Aluminum alloys typically have a higher strength to weight ratio than steel alloys. Consequently, replacing steel with aluminum offers potential for weight reduction. Steel alloys and aluminum alloys may have different material properties. For example, aluminum alloys have a different coefficient of thermal expansion than steel alloys. These differences require unique design solutions in addition to material substitution.

SUMMARY

According to one embodiment, a method of assembling vehicle-body components includes positioning a first component on a second component. The first component has a different coefficient of thermal expansion than the second component and one of the first and second components defines a slot. The method also includes loosely installing a bolt though the slot and the first and second components, and creating a joint in the first and second components. The method further includes heating the first and second components, which causes the first and second components to move relative to each other due to thermal expansion in response to the heating. This movement causes the joint to fail. The method also includes tightening the bolt.

According to another embodiment, a method of assembling a vehicle-body assembly includes positioning a first component on a second component. The first component has a different coefficient of thermal expansion than the second component, and one of the first and second components defines a slot. The method also includes installing a fastener assembly through the slot to join the first and second components. At least a portion of the fastener assembly is configured to disintegrate when exposed to a surface-treatment solution. The method further includes dipping the first and second components in the surface-treatment solution causing the at least a portion of the fastener assembly to disintegrate and the first and second components to thermally expand. The method also includes retightening the fastener.

According to yet another embodiment, a door-in-white assembly includes an inner panel having a mounting surface and a beam attached to the mounting surface by a fastener assembly. The beam has a lower coefficient of thermal expansion than the panel. The fastener assembly has at least one component configured to disintegrate during electro-coating such that the fastener assembly loosens allowing relative movement between the panel and beam resulting from thermal expansion during the electro-coating.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
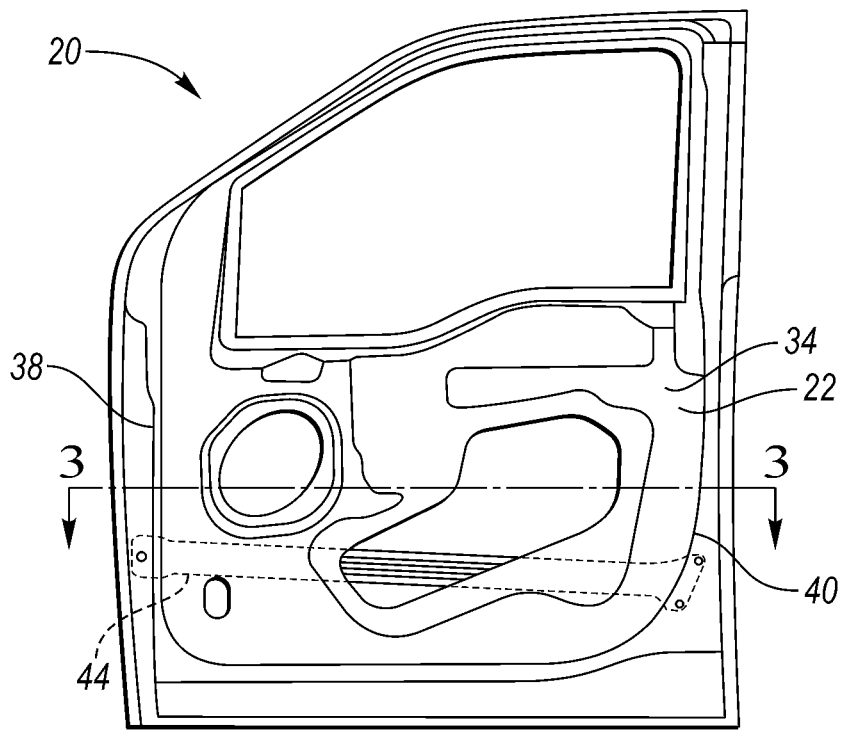
FIG. 1 is a side view of a door-in-white assembly looking at the inside of the assembly.
Figure 2:
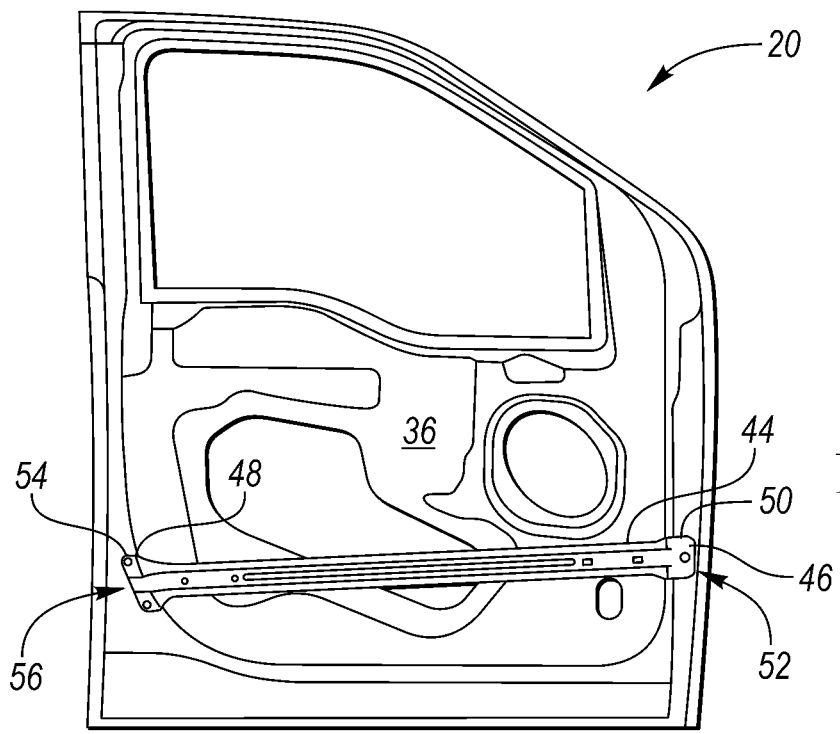
FIG. 2 is a side view of the assembly of FIG. 1 looking at the outside of the assembly with the outer panel removed.
Figure 3:
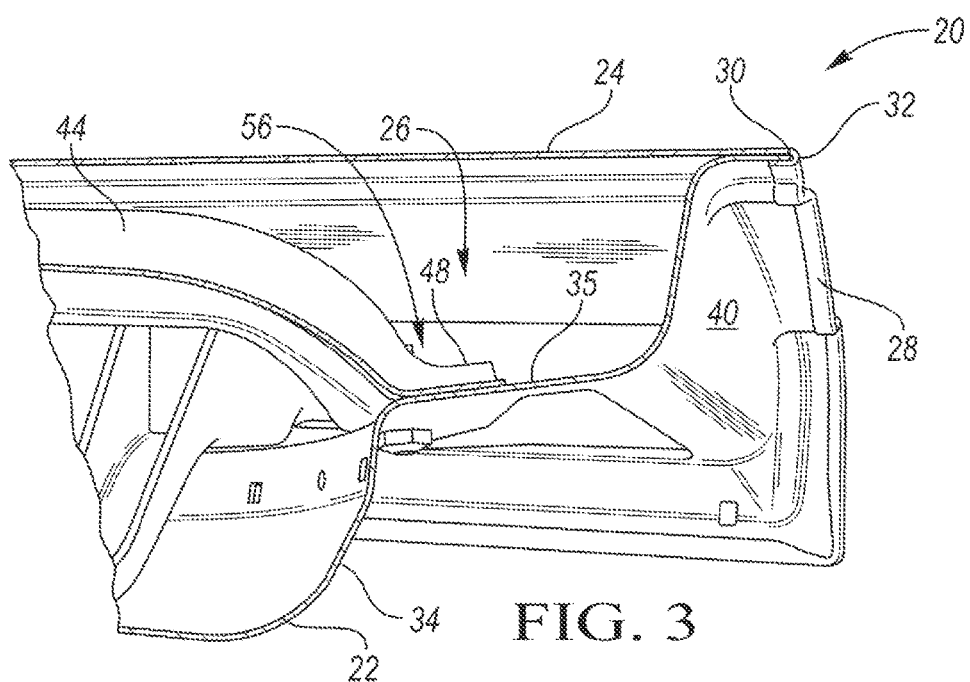
FIG. 3 is a top view, in cross-section, of the assembly of FIG. 1 at cut line 3-3.

Referring to FIGS. 1, 2 and 3 a door-in-white assembly 20 includes an inner panel 22 and outer panel 24 that define an inner cavity 26. The door-in-white assembly 20 may be a driver-side door, a passenger-side door, a rear door, or other door of a vehicle. The inner and outer panels 22, 24 may be made of steel, or may be made of a lightweight material—such as aluminum alloy, magnesium alloy or composite. The inner panel 22 includes an interior side 34 that faces the cabin and an exterior side 36 that faces the outer panel 24. The inner panel 22 may include a plurality of surfaces such as a hinge face 38 and a latch face 40. The assembly 20 is attached to the vehicle via a hinge that is attached to the hinge face 38. The assembly 20 includes a latch on the latch face 40 for securing the door in a closed position.

The door-in-white assembly 20 also includes a beam 44, such as an anti-intrusion beam, disposed within the cavity 26 and attached to the exterior side 36 of the inner panel 22. The beam 44 includes a first end 46 and a second end 48. The first end 46 is attached to a first mounting surface 50 of the inner panel 22 at a first joint 52. The second end 48 is attached to a second mounting surface 54 of the inner panel 22 at a second joint 56. The beam 44 may extend longitudinally from the front of the door (i.e. the hinge face) to the rear of the door (i.e. the latch face), and acts as a passive safety device. As such, door beams are typically made of high-strength materials, such as steel.

Many of the door components, including the inner and outer panels, and the beam, are stamped separately and are assembled into a door-in-white assembly in a plurality of stages. In one stage, the beam 44 is attached to the inner panel 22. In a subsequent stage, commonly referred to as "door setting" the inner and outer panels 22, 24 are joined together by a hemming process. For example, the outer panel 24 is larger than the inner panel 22 and includes a flange 28 that is typically bent at 90 degrees relative to the main body of the outer panel 22. During hemming, an outer portion 30 of the inner panel 22 is placed against the outer panel 24 near the flange 28. The flange is folded over the outer portion 30 creating the hem 32, which holds the panels together. Adhesive may be applied to the hem 32 for increased strength and corrosion resistance. During the door-setting stage, the joints 52, 56 between the inner panel 22 and the beam 44 may be tight to help ensure a proper geometry of the door. After the door is set, the door may undergo painting stages. The term painting generally denotes a series of consecutive stages that may include applying one or more surface-treatment solutions to the components and passing the components though one or more ovens. The surface-treatment solutions may include cleaning, phosphorus coating, electro-coating (E-coating), and painting. The painting stages typically subject the door to heat. For example, the E-coating oven may have a temperature between 150° C. and 190° C. The various door components thermally expand when subjected to the painting stages and contract when cooled. Therefore, the door components may expand and contract several times throughout the assembly process.

To reduce vehicle weight, some components of the door 20 may be made of lightweight metal alloys. For example, the inner and outer panels 23, 24 may be an aluminum alloy. But, the door beams 44 typically remain steel. Having a bimetal door assembly 20 creates many manufacturing challenges. Heat exposure during painting causes the components of the door 20 to thermally expand. The amount of thermal expansion is a function of the coefficient of thermal expansion (CTE), which is an inherent property of the material. Different metals typically have different CTEs. For example, a typical CTE for steel is $12\times10^{-6}/C.°$ and a typical CTE for aluminum alloy is $23.6\times10^{-6}/C.°$. Because the CTE is higher for aluminum, the aluminum components will expand more than the steel components. This can cause distortion, breakage, cracking and other problems. Thus, in an example door assembly 20 that has aluminum alloy panels 22, 24 and a steel beam 44, the panels will expand approximately 50% more than the beam 44, which can cause any of the above identified problems.

These problems can be mitigated by allowing relative movement between the mounting surfaces 50, 54 and the beam 44 during high-heat stages of assembly. But simply leaving one end of the beam 44 loose is not an optimum solution because the beam needs to be adequately attached to the inner panel 22 during other stages of assembly. For example, the beam needs to be adequately attached on both ends to set the geometry of the door. Thus, the loose-end technique requires the beam to be tightly attached, loosened, and retightened during door construction. This may be labor and time intensive, and may be ill suited for mass production.

Figure 4:
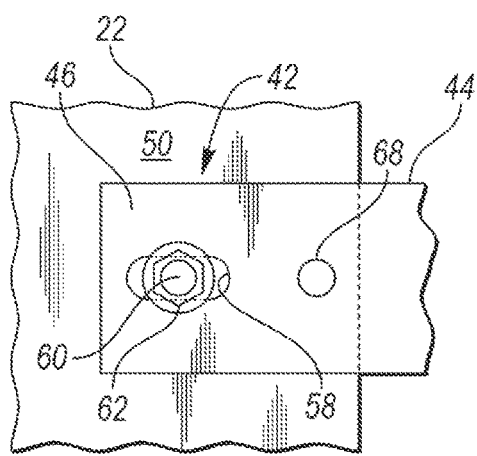
FIG. 4 is a magnified side view of one of the joints for attaching the beam and inner panel.
Figure 5:
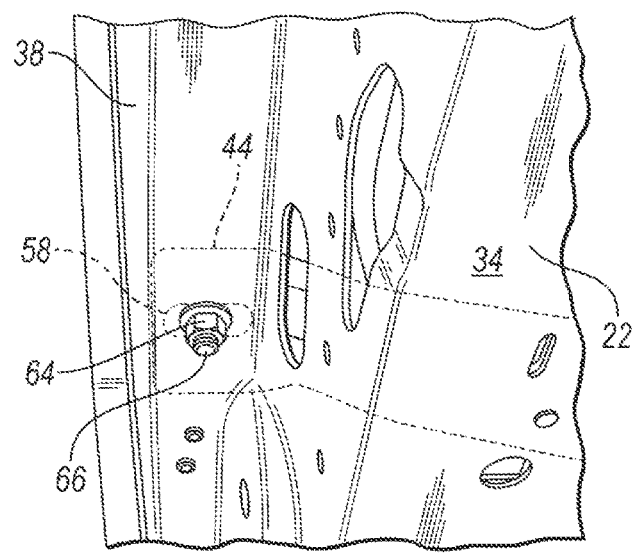
FIG. 5 is a magnified perspective view of the assembly of FIG. 1.

To prevent damage to the door 20 during painting, one of the joints 52, 56 may be configured to allow relative movement between the beam 44 and the inner panel 22. FIGS. 4 and 5 illustrate an example joint 42 that allows the beam 44 and the inner panel 22 to slide relative to each other when the beam and panel thermally expand. The beam 44 may define a slot 58 elongated in the longitudinal direction of the beam 44. A bolt 60 may connect the beam 44 to the mounting surface 50. The bolt 60 may be received through the slot 58 and a hole defined in the mounting surface 50. The bolt 60 may be arranged with the head 62 disposed against the beam 44 and with the shank 66 extending out of the interior side 34 of the inner panel 22. A nut 64 may be threaded onto the shank 66. The bolt 60 may include a hex head, an allen head, a torqx head, a phillips head, a straight blade head or any other type of driven fastener. The bolt 60 can slide within the slot 58 when the bolt is in a loosened condition and cannot slide within the slot 58 when in a tightened condition. The tightness of the bolt 60 varies throughout the door construction process. For example, the bolt 60 may be in the loosened condition during paint and all previous stages, and is in the tightened condition post paint and all future stages.

The amount or status of the components of the joint 42 may vary throughout the door construction process. FIG. 4 illustrates the joint 42 prior to painting. At this stage, the joint 42 includes an intact fastening means 68. The fastening means 68 may be a rivet, a bolt, a screw, a clinch joint, a weld, or adhesive. The fastening means 68 prevents the inner panel 22 and the beam 44 from moving relative to each other when intact. The different stages of door production place different amounts of stress on the joint 42. For example, the forces exerted on the fastening means 68 during the door-setting stage may be less than the forces exerted during one or more of the painting stages. Because of this, the fastening means 68 may be designed to withstand the forces during some phases and fail during other phases. For example, the fastening means 68 may be configured to hold the joint 42 together during the door-setting phase and fail during one of the painting stages to allow the inner panel 22 to move relative to the beam 44. The failure mechanism of the fastening means 68 is dependent upon which type of fastening means is used. For example, if the fastening means 68 is a rivet, sheer forces created by the relative movement of the beam and panel may shear through the shank of the rivet. Or, the sheer forces may cause the rivet to pop out. If the fastening means 68 is a clinch joint, the sheer forces may cause the clinch joint to separate or pop out. In some embodiments, the fastening means 68 is a rivet, bolt or screw that is configured to at least partially disintegrate during painting. After the fastening means 68 fails, the bolt 60 loosely holds the joint 42 together such that the inner panel and beam can move relative to each other. After all the heated stages of door assembly are completed and the door 20 has cooled, the bolt 60 is sufficiently tightened to secure the joint 42.

Figure 6:
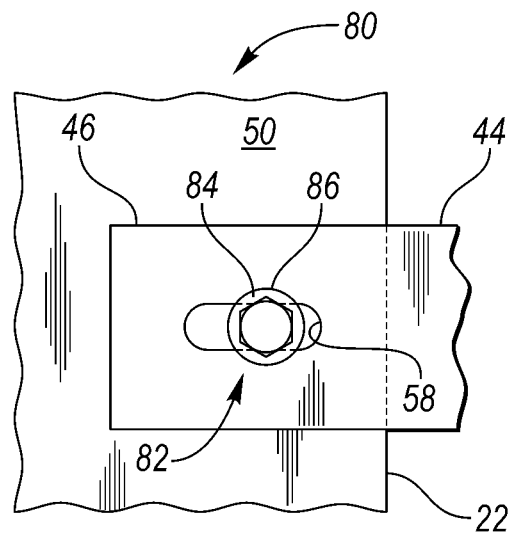
FIG. 6 is a side view of another joint for attaching the beam and inner panel.

Referring to FIG. 6 another example joint 80 is illustrated. The joint 80 may secure the first end 46 of the beam 44 to the mounting surface 50 of the inner panel 22. Alternatively, the joint 80 may be located at the second end 48 of the beam 44. The joint 80 may include a fastener assembly 82. The fastener assembly 82 may be received through the slot 58 and through a hole defined in the mounting surface 50. FIG. 6 illustrates the fastener assembly 82 prior to any painting stages.

The fastener 82 may be tightly attached during initial installation to adequately secure the joint 80 during the door-setting stage. The fastener assembly 82 includes at least one temporary component that is configured to disintegrate during painting. For example, the fastener assembly 82 may include a bolt 84, a temporary washer 86, and a nut. During one of the painting stages, the temporary washer 86 disintegrates, which causes the fastener assembly 82 to loosen, allowing the inner panel 22 and the beam 44 to move relative to each other via the slot 58 as they thermally expand. The temporary washer 86 may be made out of cardboard, wax, or compacted dirt. The temporary washer 86 includes properties that are configured to disintegrate upon contact with the surface-treatment solutions of the painting stages. For example, if cardboard or dirt, the washer is configured to dissolve. Or, if wax, the washer is configured to melt. The fastener 82 may be retightened after all heated stages are complete to secure the joint 80. The temporary component is not limited to a washer and maybe or any type of component that is designed can be designed to disintegrate during painting.

Figure 7:
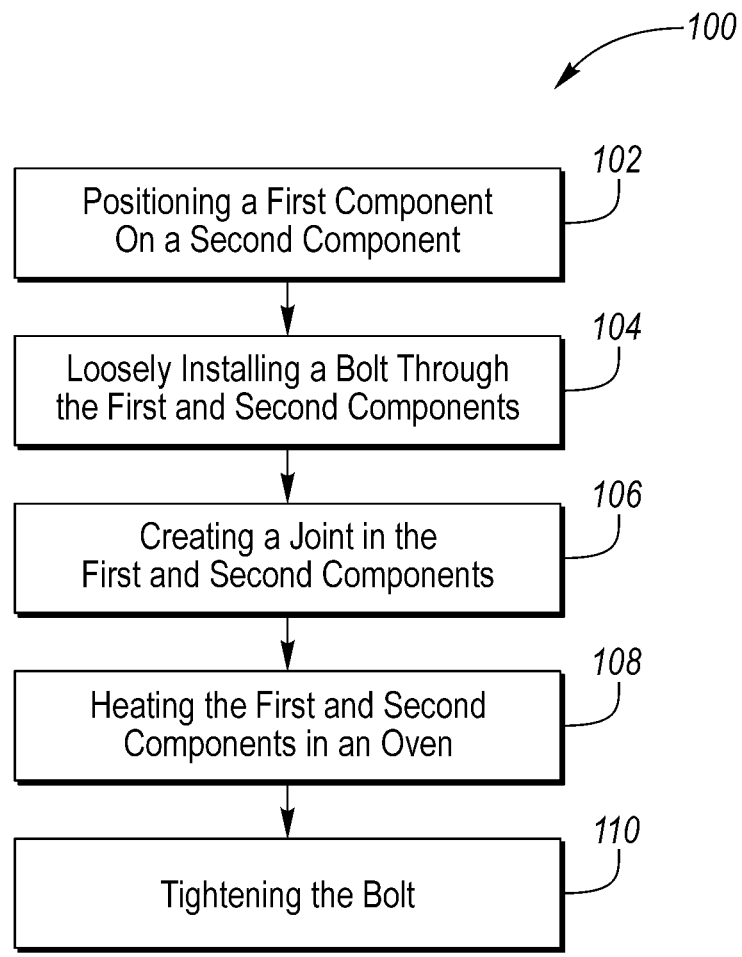
FIG. 7 is flow chart illustrating steps for assembling vehicle-body components.

FIG. 7 is an example flow chart 100 illustrating steps of a method for assembling vehicle-body components. At step 102 a first component is positioned on a second component. The first component may have a different CTE than the second component, and one of the first and second components may define a slot. At 104 a bolt is loosely installed through the first and second components. At 106 a joint is created in the first and second components. The joint may be created using any of the fastening means described above. At 108 the first and second components are heated in an oven as part of the painting process. The first and second components move relative to each other due to thermal expansion in response to being heated in the oven. The forces exerted during the relative movement cause the joint to fail. Because the bolt is loosely installed, the first and second components can freely move relative to each other via the slot. At step 110 the bolt is tightened to secure the first and second components together.

Figure 8:
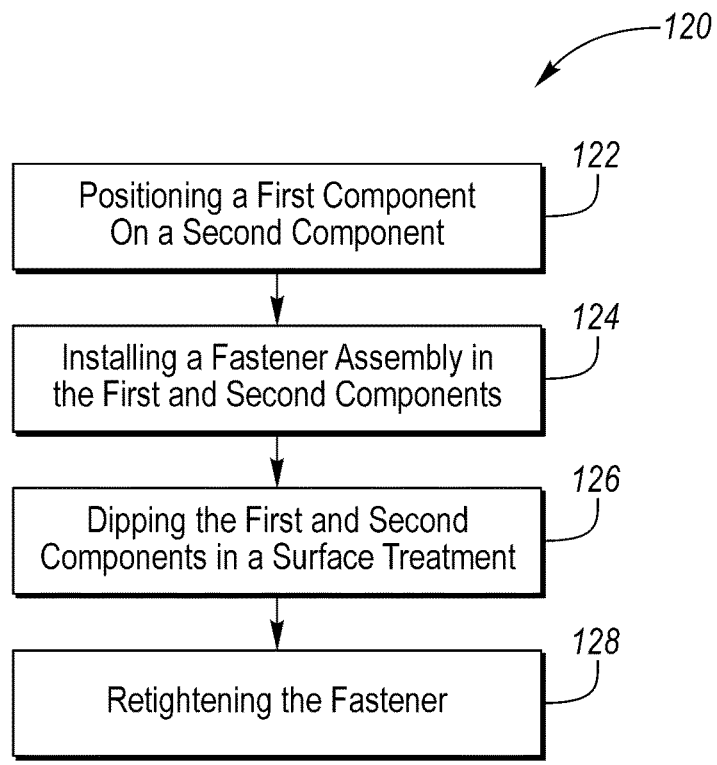
FIG. 8 is another flow chart illustrating steps for assembling vehicle-body components.

FIG. 8 is another example flow chart 120 illustrating steps of a method for assembling vehicle-body components. At step 122 a first component is positioned on the second component. The first component may have a different CTE than the second component, and one of the first and second components may define a slot. At 124 a fastener assembly is installed in the first and second components. The fastener assembly may include at least one temporary component that is configured to disintegrate when exposed to a surface treatment solution, such as an E-coating solution. At 126 the first and second components are dipped into the solution causing the temporary component to disintegrate, which loosens the fastener assembly. Once the fastener assembly becomes loosened, the first and second components can thermally expand relative to each other via the slot when heated during the various processes of painting. After the components have cooled, and all heating stages of painting are complete, the fastener may be retightened at 128.

Figure 9:
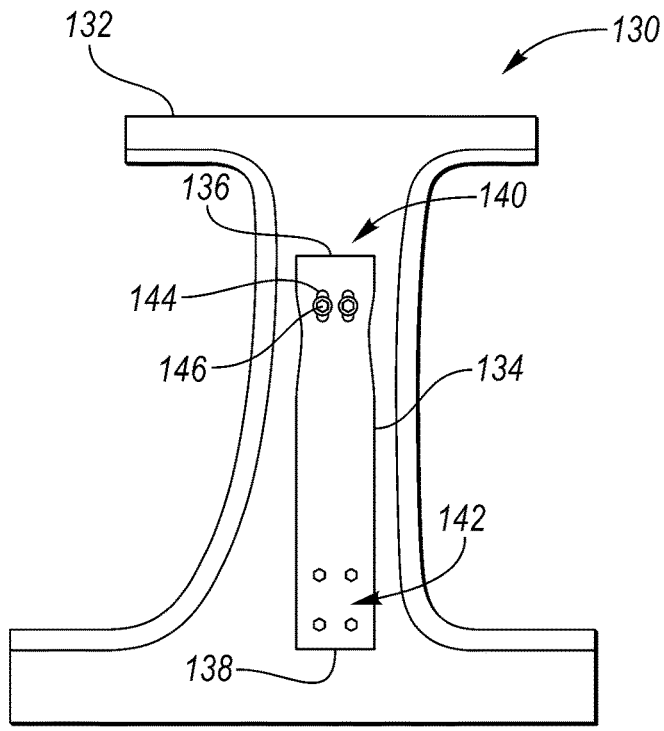
FIG. 9 is a side view of a B-pillar for a vehicle.

The joining techniques described above with respect to the door assembly 20 are not limited to door construction and may be used on other vehicle-body structures having bimetal construction. FIG. 9 illustrates a B-pillar 130 of a vehicle body that employs joining techniques similar to those described above with respect to the door assembly 20. The B-pillar 130 may also undergo painting, which causes thermal expansion of the components of the B-pillar 130. An example B-pillar 130 may include a first component 132 and a second component 134. The first component 132 may be an aluminum alloy and the second component 134 may be a steel reinforcing member. As described above, the first component 132 will thermally expand more than the second component 134 when heated. The second component 134 includes a first end 136 and a second end 138. The ends of the second component 134 are joined to the first component at a pair of joints 140, 142. One of the joints may be a fixed joint that is bolted, welded, riveted, clinched, or secured using other known techniques. The other joint may be configured to slip during painting to allow the first and second components to move relative to each other preventing any damage caused by the differential thermal expansion of the components. For example, the first end 136 may define at least one slot 144. A fastener assembly 146 may be received within each of the slots 144. The fastener assembly 146 may be similar to fastener assembly 82. As such, at least a portion of the fastener assembly 146 is configured to disintegrate upon contact with a surface-treatment solution (e.g. E-coating solution) to allow movement between the components. Alternatively, the joint 140 may be similar to the joint 42 shown in FIG. 4. Here, at least one fastening means (similar fastening means 68) will temporarily join the first and second components at one end prior to painting and will fail during painting to allow the components to move relative to each other.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of assembling vehicle-body components comprising:
    positioning a first component on a second component, wherein the first component has a different coefficient of thermal expansion than the second component and one of the first and second components defines a slot;
    loosely installing a bolt through the slot and the first and second components;
    creating a joint in the first and second components with a fastening means, wherein the fastening means is one of a rivet, a fastener, a weld, and a clinch joint;
    heating the first and second components, wherein the first and second components move relative to each other due to thermal expansion in response to the heating causing the fastening means to fail; and
    tightening the bolt.

2. The method of claim 1 wherein the first component is a door beam and the second component is an inner panel of a door.

3. The method of claim 2 further comprising attaching an outer panel to the inner panel.

4. The method of claim 1 wherein the fastening means is a rivet.

5. The method of claim 1 wherein the fastening means is a fastener that includes a portion configured to disintegrate when exposed to the heating.

6. The method of claim 1 wherein the fastening means is a clinch joint.

7. A method of assembling a vehicle-body assembly comprising:

positioning a first component on a second component, wherein the first component has a different coefficient of thermal expansion than the second component and one of the first and second components defines a slot;

installing a fastener assembly through the slot to join the first and second components, wherein at least a portion of the fastener assembly is configured to disintegrate when exposed to a surface-treatment solution;

dipping the first and second components in the surface-treatment solution causing the at least a portion of the fastener assembly to disintegrate; and retightening the fastener.

8. The method of claim 7 wherein the first component is a door beam and the second component is an inner panel of a door.

9. The method of claim 8 wherein the slot is defined in the door beam.

10. The method of claim 7 wherein the at least a portion of the fastener assembly configured to disintegrate is a washer.

11. The method of claim 10 wherein the washer is made of cardboard.

12. The method of claim 10 wherein the washer is made of wax.

13. The method of claim 10 wherein the washer is made of compacted dirt.

14. The method of claim 7 wherein the surface-treatment solution is an electro-coating solution.

15. A door-in-white assembly comprising:

an inner panel including a mounting surface; and a beam having a lower coefficient of thermal expansion than the inner panel, the beam being attached to the mounting surface by a fastener assembly including a wax or cardboard washer that disintegrates during electro-coating of the assembly such that the fastener assembly loosens allowing relative movement between the inner panel and beam resulting from thermal expansion during the electro-coating of the assembly.

16. The assembly of claim 15 wherein the washer is made of cardboard.

17. The assembly of claim 15 wherein the washer is made of wax.

18. The assembly of claim 15 wherein the beam defines a slot and wherein the fastener assembly extends through the slot.

19. The assembly of claim 15 further comprising an outer panel attached to the inner panel such that the panels define a cavity, wherein the beam is disposed within the cavity.

* * * * *